(12) United States Patent
Niemand et al.

(10) Patent No.: US 7,019,995 B2
(45) Date of Patent: Mar. 28, 2006

(54) POWER SUPPLY HAVING REDUCED-POWER MODE

(75) Inventors: Robert Niemand, Vancouver, WA (US); Duane Koehler, Vancouver, WA (US); Robert Ray, Corbett, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/713,184

(22) Filed: Nov. 15, 2003

(65) Prior Publication Data
US 2005/0105304 A1 May 19, 2005

(51) Int. Cl.
*H02M 3/24* (2006.01)

(52) U.S. Cl. .................. 363/97; 363/21.01; 323/284; 323/351

(58) Field of Classification Search ............ 363/21.04, 363/21.1, 21.11, 21.12, 21.18, 97, 131, 20, 363/21.01; 323/284, 285, 351
See application file for complete search history.

(56) References Cited

U.S. PATENT DOCUMENTS

| | | | |
|---|---|---|---|
| 4,325,115 A | 4/1982 | Johnson | |
| 5,747,977 A | 5/1998 | Hwang | |
| 5,751,565 A * | 5/1998 | Faulk ........................ | 363/41 |
| 6,130,528 A | 10/2000 | Aoyama | |
| 6,151,224 A | 11/2000 | Lim et al. | |
| 6,188,587 B1 | 2/2001 | Yun et al. | |
| 6,212,079 B1 | 4/2001 | Balakrishnan et al. | |
| 6,252,783 B1 | 6/2001 | Huh et al. | |
| 6,452,366 B1 | 9/2002 | Hwang | |
| 6,452,816 B1 | 9/2002 | Kuranuki et al. | |
| 6,480,401 B1 | 11/2002 | Tang | |
| 6,496,390 B1 * | 12/2002 | Yang ........................ | 363/21.07 |
| 6,538,419 B1 * | 3/2003 | Allen et al. ................. | 323/285 |
| 6,549,429 B1 * | 4/2003 | Konno ..................... | 363/21.04 |
| 6,563,720 B1 | 5/2003 | Kitano | |
| 6,798,086 B1 * | 9/2004 | Utsunomiya ................ | 307/154 |
| 2002/0131279 A1 | 9/2002 | Tang | |

* cited by examiner

*Primary Examiner*—Gary L Laxton

(57) ABSTRACT

A power supply of one embodiment of the invention is disclosed that includes a conversion mechanism and a feedback mechanism. The conversion mechanism is to control conversion of a first direct current (DC) signal from to a second DC signal provided to an electronic device by switching the first DC signal to vary the second DC signal. The feedback mechanism is to cause the switching control mechanism to operate in a nominal-power mode or a reduced-power mode according to a control signal received from the electronic device. The conversion mechanism is caused in the reduced-power mode to lessen at least one of the duty cycle and the frequency at which the first DC signal is switched until the voltage of the second DC signal decays to a first voltage level.

30 Claims, 6 Drawing Sheets

POWER SUPPLY HAVING REDUCED-POWER MODE

BACKGROUND

Many electronic devices, such as computer peripherals like printers, can consume large amounts of power when they are on, even when they are idle and not currently performing functional tasks. For example, when inkjet and laser printers and other types of image-forming devices are on, they may have to consume large amounts of power when idle so that when called upon to print, the printers can quickly begin printing. Other electronic devices, such as other types of computer peripherals and other types of electronic devices, may similarly use large amounts of power when idle.

However, individuals, organizations, and governments have recently begun to question the power consumption used by such devices, especially when they are idle and not otherwise performing functional tasks. Individuals and organizations are looking for greater energy efficiency to lower their electrical bills. Governments are looking for greater energy efficiency so that the need to build more power plants is reduced, and to avoid brownout and blackout scenarios when power plants are operating at peak capacity. This is especially the case in extremely hot weather, when air conditioners may be running constantly, and utilizing more power than they otherwise would.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the embodiments of the invention. Other embodiments may be utilized, and logical, mechanical, and other changes may be made without departing from the spirit or scope of the appended claims. The following detailed description is, therefore, not to be taken in a limiting sense, and the scope of the present invention is defined only by the appended claims.

Power Supply and Method

Figure 1:
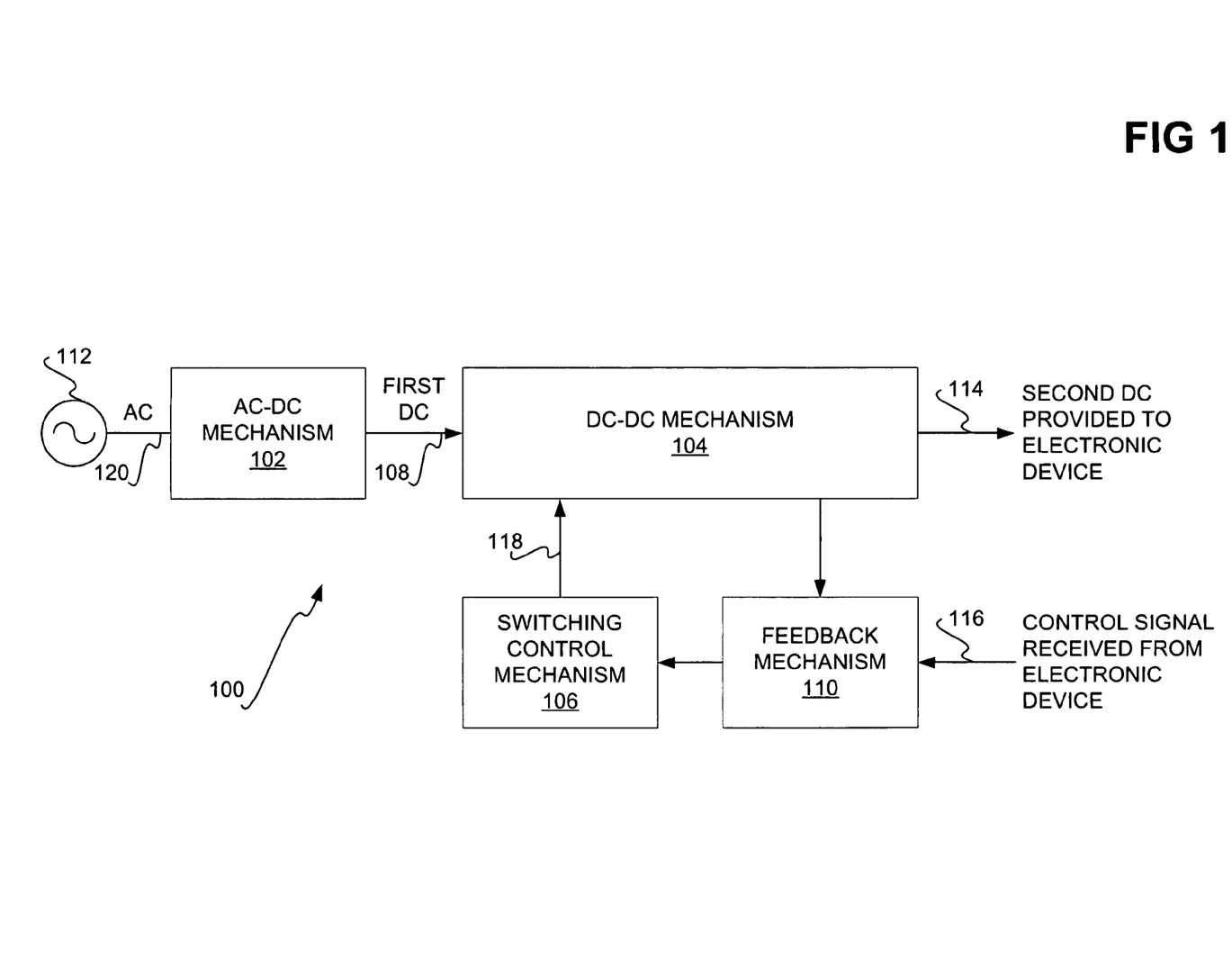
FIG. 1 is a diagram of an embodiment of a power supply, according to an embodiment of the invention.

FIG. 1 shows an embodiment of a power supply, power supply 100, according to an embodiment of the invention. The power supply 100 is for an electronic device, not depicted in FIG. 1, and may be internal or external to the electronic device. The electronic device may be an image-forming device, such as an inkjet-printing device or a laser-printing device, or another type of device other than an image-forming device. The power supply 100 specifically receives a first alternating current (AC) signal from a power source 112, such as a wall outlet, as indicated by the arrow 120, and converts it to a first direct current (DC) signal, as indicated by the arrow 108, which is then converted to a second DC signal, as indicated by the arrow 114, to provide to the electronic device. The difference between the first DC signal and the second DC signal is that the first DC signal may not be regulated, and may not have the proper voltage level for the electronic device to operate, as compared to the second DC signal. The power supply 100 operates in a full-power, or normal-power or nominal-power, mode, in which the second DC signal is provided to the electronic device at a full, normal, or nominal level while the electronic device is actively operating or functioning, and in a low-power mode, which may more generally be referred to as a reduced-power mode, in which second DC signal is provided at a lower current, voltage, and/or power level while the electronic device is idling, or not actively operating or functioning.

The power supply 100 includes an AC-DC mechanism 102, a DC-DC mechanism 104, a switching control mechanism 106, and a feedback mechanism 110. The AC-DC mechanism 102 receives the first AC signal from the power source 112 and converts the first AC signal to the first DC signal, and includes those components that enable it to receive the first AC signal from the power source 112 and convert the first AC signal to the first DC signal. The DC-DC mechanism 104 converts the first DC signal to the second DC signal, provides the second DC signal to the electronic device, as indicated by the arrow 114, and includes those components that enable it to convert the first DC signal to the second DC signal and provide the second DC signal to the electronic device. The DC-DC mechanism 104 converts the first DC signal to the second DC signal by switching by switching the first DC signal high and low, and is controlled by the switching control mechanism 106.

The switching control mechanism 106 may also be referred to as a conversion mechanism. The switching control mechanism 106 includes those components that enable it to control the conversion of the first DC signal to the second DC signal, by switching the first DC signal such that the second DC signal is varied, as indicated by the arrow 118. The feedback mechanism 110 causes the switching control mechanism 106 to operate either in the full-power mode or the low-power mode, according to a control signal received from the electronic device, as indicated by the arrow 116. The feedback mechanism 110 therefore contains the components that enable it to cause the switching control mechanism 106 to operate in the full-power mode or the low-power mode, based on the control signal. It is noted that receiving of the control signal encompasses deriving the control signal from another type of signal, as well as receiving a direct signal. Furthermore, the utilization of the control signal allows for the anticipation of load changes by the power supply 100, based on the information presented by the electronic device as encompassed within the control signal.

Figure 2A:
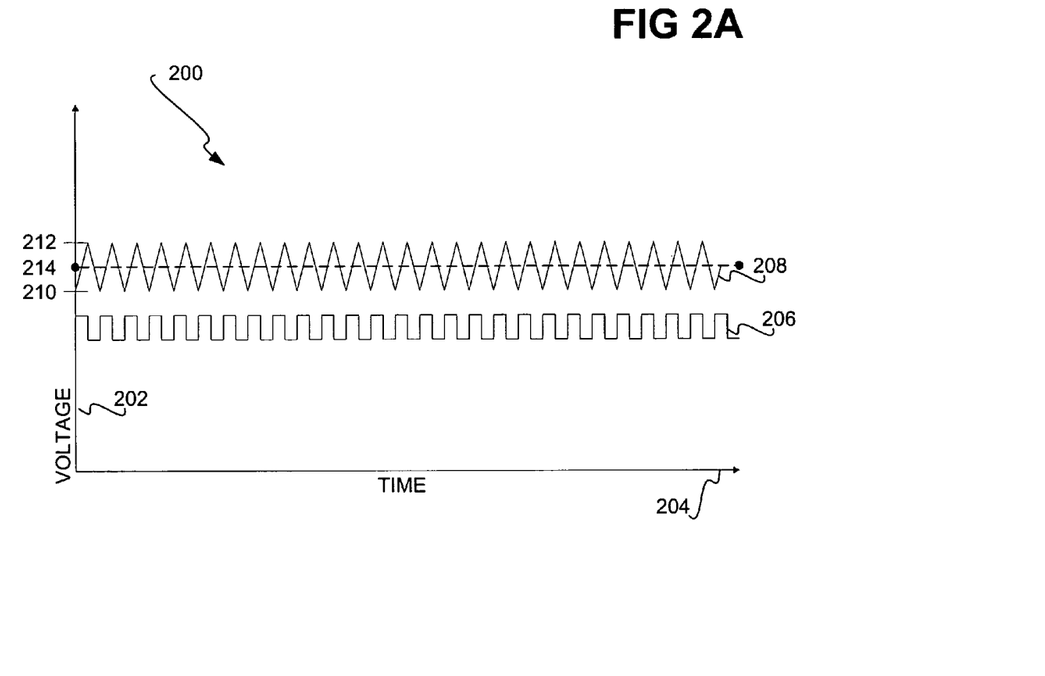
FIGS. 2A and 2B are graphs of example waveforms within the power supply of FIG. 1 in full- or normal-power mode, and in low-power mode, respectively, according to an embodiment of the invention.
Figure 2B:
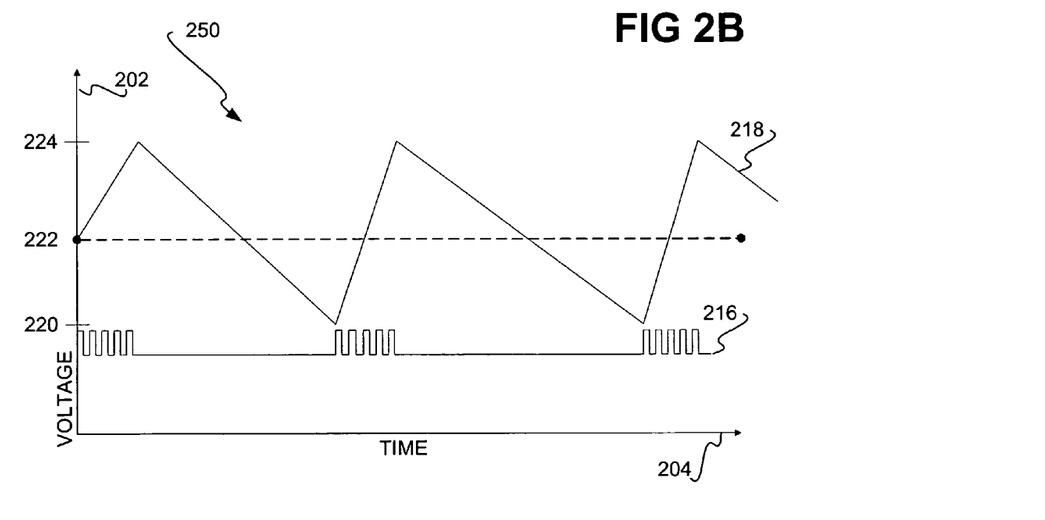

FIGS. 2A and 2B show graphs 200 and 250 of the waveforms provided by the switching control mechanism 106 and the DC-DC mechanism 104, in the full-power mode and the low-power mode, respectively, according to an embodiment of the invention. The y-axis 202 of the graphs 200 and 250 denotes voltage as a function of time on the x-axis 204. In the full-power, or normal-power, mode, the signal output by the switching control mechanism 106 and input by the DC-DC mechanism 104, as identified by the arrow 118 in FIG. 1, is the control waveform 206. The control waveform 206 is in particular an example waveform that is at a fifty-percent duty cycle, and may in other embodiments be a different type of waveform. The waveform of the second DC signal output by the DC-DC mechanism 104, as identified by the arrow 114 in FIG. 1, in the full-power mode is the output waveform 208. The output waveform 208 is a rudimentary linear depiction of a decaying voltage, and may be represented in other manners, such as an exponential decay. In the low-power mode, the waveform identified by the arrow 118 in FIG. 1 is the control waveform 216, whereas the waveform identified by the arrow 114 in FIG. 1 is the output waveform 218.

In the full-power mode, the switching control mechanism 106 is caused by the feedback mechanism 110 to switch the first DC signal at a duty cycle and at a frequency, such that the voltage of the output waveform 208 of the second DC signal fluctuates between a voltage level 210 and a voltage level 212, and has an average voltage level 214. When the voltage of the output waveform 208 increases to the level 212, the control waveform 206 changes state, so that the voltage of the output waveform 208 decreases. When the voltage of the output waveform 208 decays to the level 210, the control waveform 206 goes high, so that the voltage of the output waveform 208 increases. The rate at which the control waveform 206 switches high and low is the frequency, and the ratio between the control waveform 206 being high and the total high and low portions of the control waveform 206 is the duty cycle. The output waveform 208 is a regulated DC signal, so that the electronic device can operate when actively functioning.

In the low-power mode, the switching control mechanism 106 is caused by the feedback mechanism 110 to switch the first DC signal at a different frequency and/or duty cycle, such that the voltage of the output waveform 218 of the second DC signal fluctuates between a voltage level 224 and a voltage level 220, and has an average voltage level 222. When the voltage of the output waveform 218 increases to the level 224, the control waveform 206 goes low, so that the voltage of the output waveform 218 decreases. That is, the feedback mechanism 110 causes the switching control mechanism 106 to lessen switching the first DC signal, by lessening the frequency and/or the duty cycle of the switching. In FIG. 2B, this lessening of switching is shown as a complete stoppage of switching, whereas in other embodiments, lessening of switching may instead reduce the frequency and/or duty cycle of the switching. When the voltage of the output waveform 218 decreases or decays to the level 220, the control waveform 216 again resumes switching at the duty cycle, in what can be referred to as a burst mode, so that the voltage of the output waveform 218 increases. The duty cycle at which the control waveform 216 resumes switching may be the same as the duty cycle of the control waveform 206, or may be a higher efficiency duty cycle. Having the duty cycle at which the control waveform 216 resumes switching be of higher efficiency than the duty cycle of the control waveform 206 lowers average power loss, which increases efficiency of the power supply 100. Furthermore, the voltage of the output waveform 218 may not need to be as tightly regulated as the output waveform 208, since the electronic device is idling.

Figure 3:
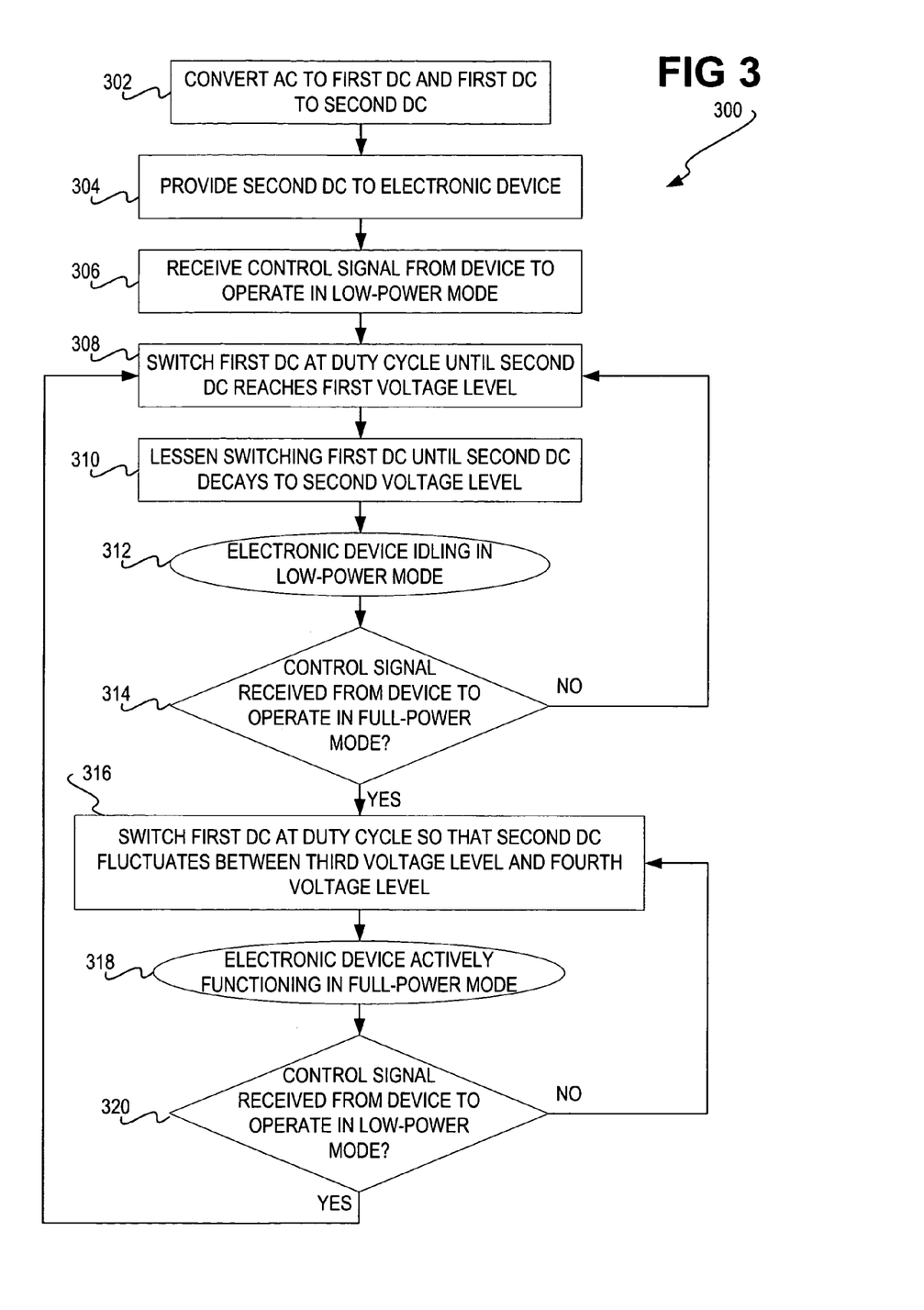
FIG. 3 is a flowchart of a method, according to an embodiment of the invention.

FIG. 3 shows a method 300 for performance by the power supply 100 of FIG. 1 in accordance with the graphs 200 and 250 of FIGS. 2A and 2B, according to an embodiment of the invention. The first AC signal from the power source 112 is converted to the first DC signal, and the first DC signal is converted to the second DC signal (302). The second DC signal is provided to the electronic device (304), as indicated by the arrow 114. The power supply 100 receives a control signal from the electronic device to operate in the low-power mode (306). As a result, the first DC signal is switched at a duty cycle and at a frequency until the voltage of the second DC signal reaches a first voltage level, such as the voltage level 224 (308). Once the voltage of the second DC signal reaches the first voltage level, switching of the first DC signal is stopped, or lessened, until the voltage of the second DC signal decays to a second voltage level, such as the voltage level 220 (310). The electronic device is thus idling in the low-power mode (312).

If a control signal is not received from the electronic device to switch operation of the power supply 100 to the full-power mode (314), 308, 310, and 312 are repeated. Once a control signal is received from the electronic device to switch operation of the power supply 100 to the full-power mode (314), then the first DC signal is switched at a duty cycle and at a frequency so that the voltage of the second DC signal fluctuates between a third voltage level and a fourth voltage level (316). The duty cycle and/or the frequency at which the first DC signal is switched in the full-power mode can be higher than the duty cycle and/or the frequency at which the first DC signal is switched in the low-power mode. The third voltage level may be the voltage level 212, and the fourth voltage level may be the voltage level 210. The electronic device is thus actively functioning, or operating, in the full-power, or normal-power mode (318). If a control signal is not received from the electronic device to switch operation of the power supply 100 back to the low-power mode (320), then 316 and 318 are repeated. Once a control signal is received from the electronic device to switch operation of the power supply 100 back to the low-power mode (320), the method 300 is performed again, starting at 308.

It is noted that the method 300 of FIG. 3 is described such that the electronic device idles in the low-power mode, in 312, before it actively functions in the full-power mode, in 318. However, in a different embodiment of the invention, the electronic device may actively function in the full-power mode before idling in the low-power mode. That is, after performing 304, the method 300 may in another embodiment of the invention next perform 316, so that the electronic device actively functions in the full-power mode before entering the low-power mode, as can be appreciated by those of ordinary skill within the art.

Power Supply in Detail and Electronic Device

Figure 4:
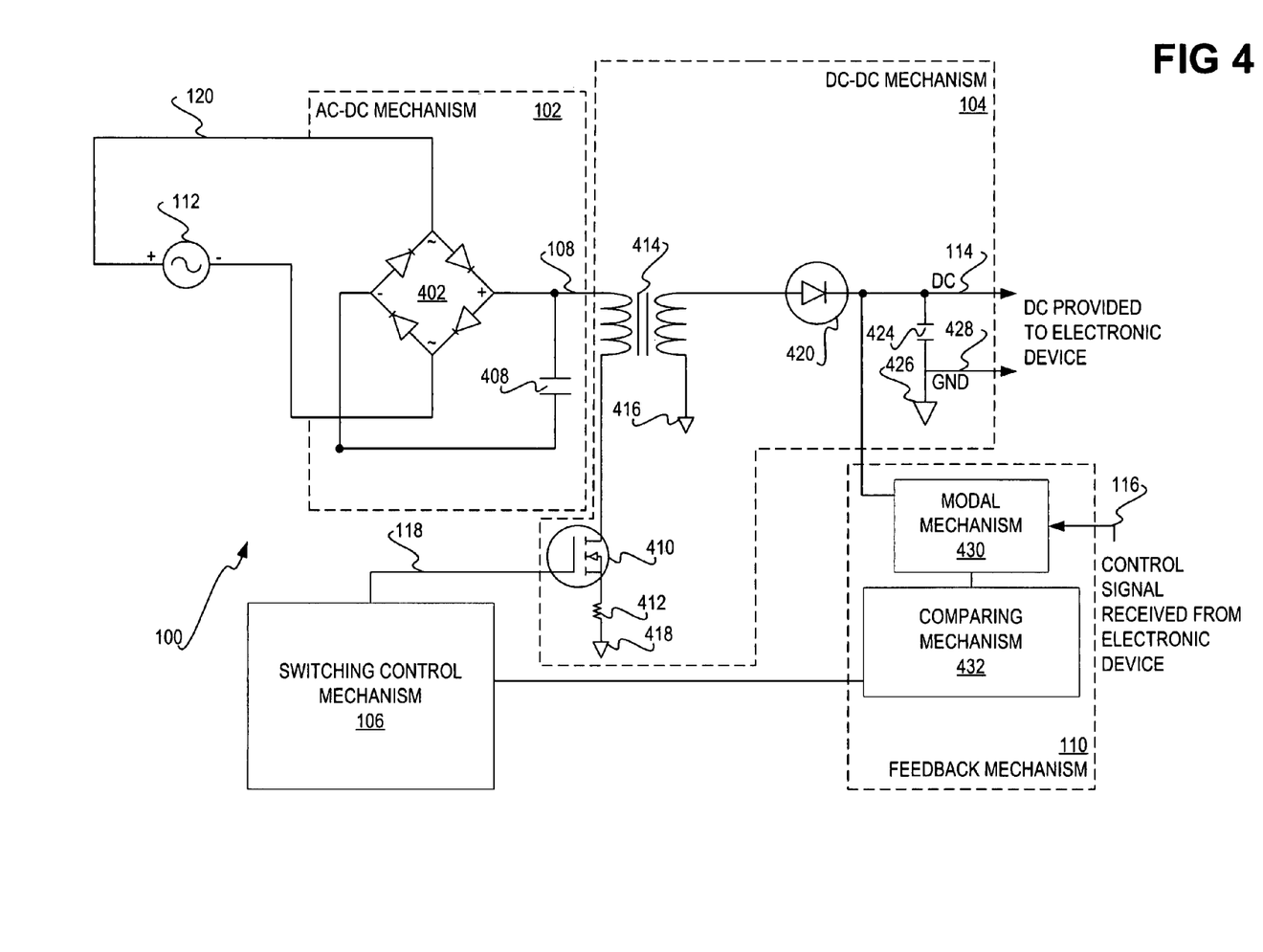
FIG. 4 is a diagram of an embodiment of a power supply in more detail than but consistent with the power supply of FIG. 1, according to an embodiment of the invention.

FIG. 4 shows the power supply 100 such that it is more detailed than but consistent with the embodiment of FIG. 1, according to an embodiment of the invention. The power supply 100 again converts a first alternating current (AC) signal from the power source 112, as indicated by the arrow 120, to a second direct current (DC) signal provided to an electronic device, as indicated by the arrow 114. The power supply 100 is operable in a normal-power, or full-power mode, and a low-power mode, depending on a control signal received from the electronic device, as indicated by the arrow 116. For example, asserting the control signal, such that the control signal is present, may indicate to the power supply 100 to operate in the low-power mode, and not asserting the control signal, such that it is absent, may indicate to the power supply 100 to operate in the normal-power mode.

The power supply 100 includes the AC-DC mechanism 102, the DC-DC mechanism 104, the switching control mechanism 106, and the feedback mechanism 110. The AC-DC mechanism 102 includes a full-wave bridge rectifier 402, connected to the positive and negative terminals of the power source 112. The power source 112 may also include a ground terminal connected to ground. The negative side of the rectifier 402 may be connected to ground, whereas the positive side of the rectifier 402 is connected to a regulating capacitor 408.

The DC-DC mechanism 104 includes a transistor 410, a resistor 412 connected in series between the transistor 410 and a ground 418, which may be Earth ground or another type of ground, and a transformer 414. The transformer 414 converts the first DC signal received from the AC-DC mechanism 102 on one side to the second AC signal on its other side, which is also connected to a ground 416, which may be Earth ground or another type of ground. The transistor 410 is controlled by the switching control mechanism 106. That is, the switching control mechanism 106 controls switching of the first DC signal provided to the transformer 414 high and low. The switching control mechanism 106 may be a ringing choke converter (RCC), a pulse-width modulated (PWM) switcher, or may be a switching control mechanism that utilizes another type of switching topology.

The DC-DC mechanism 104 further includes a half-wave rectifier 420, and a regulating capacitor 424, which generate the second DC signal from the second AC signal. The capacitor 424 is connected in parallel between the second DC signal and a ground input of the electronic device. It is noted that the utilization of the half-wave rectifier 420 and the regulating capacitor 424 is an example topology that can be employed to generate the second DC signal from the second AC signal. In other embodiments of the invention, other topologies may be used to generate the second DC signal from the second AC signal. The second DC signal is indicated by the arrow 114, whereas the ground input is indicated by the arrow 428, where the ground input is connected to a ground 406, such as an Earth ground or another type of ground. The ground input, and thus one side of the capacitor 424, is also connected to a pull-down 426. The DC-DC mechanism 104, besides providing the second DC signal to the electronic device, also provides a measure of the second DC signal to the feedback mechanism 110, due to its connection thereto. This measure of the second DC signal enables the feedback mechanism 110 to be able to determine the type of feedback signal to provide to the switching control mechanism 106, in order for the switching control mechanism 106 to appropriately control switching of the first DC signal by the DC-DC mechanism 104.

The feedback mechanism 110 includes a modal mechanism 430 and a comparing mechanism 432. The comparing mechanism 432 compares the voltage of the second DC signal provided to the electronic device by the DC-DC mechanism 104 to the voltage levels 210 and 212 of FIG. 2A. In response, the comparing mechanism 432 generates a feedback signal to cause the switching control mechanism 106 to switch the first DC signal low upon the voltage of the second DC signal reaching the voltage level 212 so that the second DC signal decreases, and to switch the first DC signal high upon the voltage of the second DC signal reaching the voltage level 210 so that the second DC signal increases. The comparing mechanism 432, without input from the modal mechanism 430, enables the switching control mechanism 106 to operate the DC-DC mechanism 104 in the normal-power, or full-power mode.

The modal mechanism 430 effectively skews comparison of the voltage of the second DC signal to the voltage levels 210 and 212 of FIG. 2A, by using in one embodiment a time-voltage sensitive reactive device (513), in response to receiving the control signal from the electronic device, such that the power supply 100 is to operate in the low-power mode. As a result, the comparing mechanism 432 instead is effectively caused by the modal mechanism 430 to compare the voltage of the second DC signal to the voltage levels 220 and 224. In response, the comparing mechanism 432 is caused to generate a feedback signal to cause the switching control mechanism 106 to switch the first DC signal low upon the voltage of the second DC signal reaching the voltage level 224, so that the DC signal decreases or decays, and to switch the first DC signal at a duty cycle and at a frequency upon the voltage of the second DC signal decreasing to the voltage level 220 so that the second DC signal increases.

In other words, the modal mechanism 430 essentially passes through the measure of the second DC signal to the comparing mechanism 432 without modification, to allow the switching control mechanism 106 to operate in the full-power mode. The modal mechanism 430 also essentially modifies the second DC signal before passing a skewed measure of the second DC signal to the comparing mechanism 432 to cause the switching control mechanism 106 to operate in the low-power mode. When the control signal is not asserted by the electronic device, such that it is absent, the modal mechanism 430 passes through the second DC signal to the comparing mechanism 432, and when the control signal is asserted by the electronic device, such that it is present, the modal mechanism 430 modifies the DC signal before passing it to the comparing mechanism 432. It is noted that the skewing of the second DC signal to comparing mechanism 432 in the low-power mode is voltage-time sensitive. This allow for higher efficiency to be realized, as well as power utilization by the load to be lessened.

Figure 5:
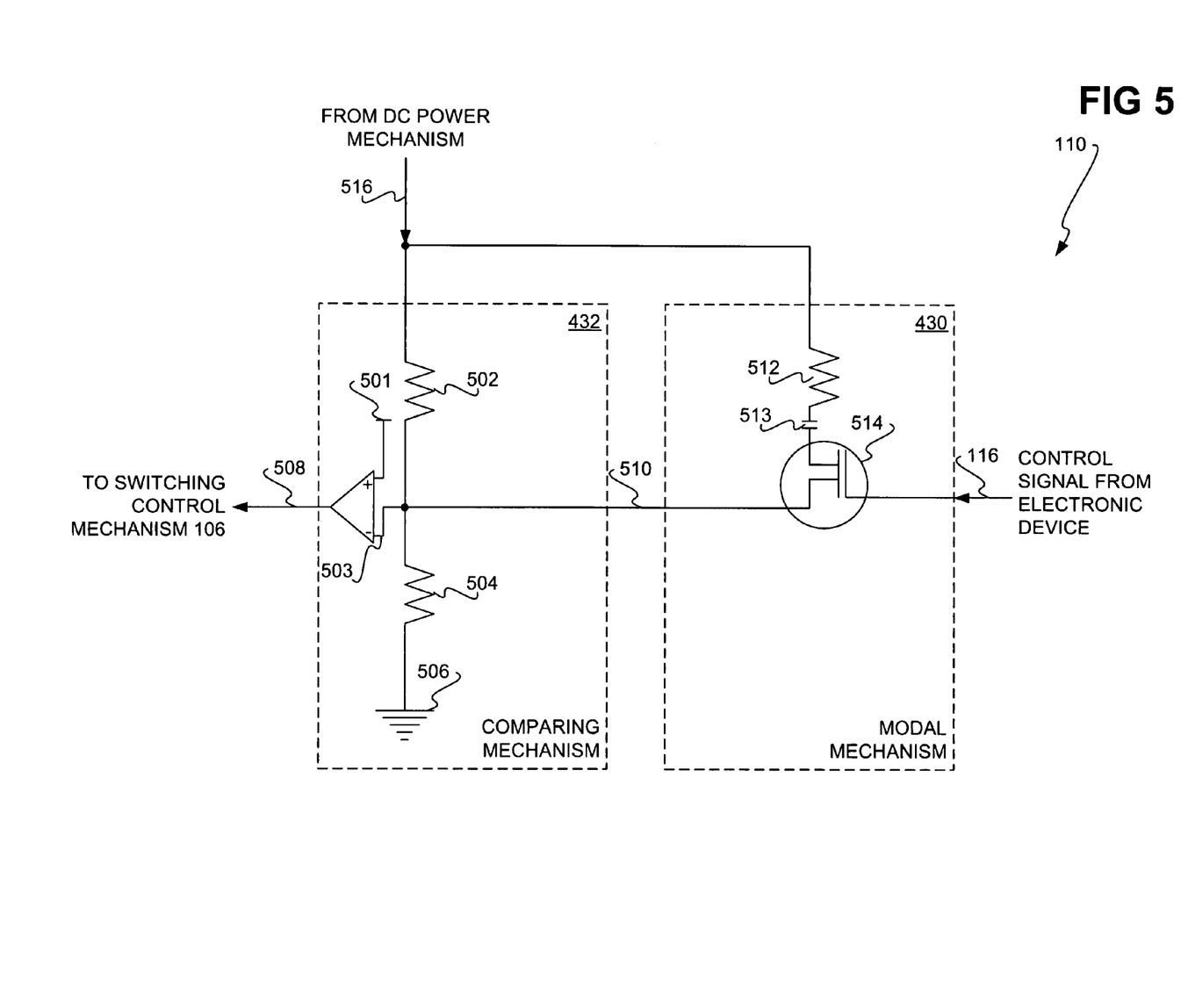
FIG. 5 is diagram of the feedback mechanism of FIG. 4 in more detail, according to an embodiment of the invention.

FIG. 5 shows a diagram of the modal mechanism 430 and the comparing mechanism 432 of the feedback mechanism 110 in more detail, according to an embodiment of the invention. As indicated by the incoming arrow 516, both the comparing mechanism 432 and the modal mechanism 430 receive a measure of the second DC signal provided to the electronic device, from the DC-DC mechanism 104. The comparing mechanism 432 provides a feedback signal 508 to the switching control mechanism 106. The modal mechanism 430 receives a control signal from the electronic device, as indicated by the incoming arrow 116.

The comparing mechanism 432 includes a resistive divider represented by two resistors 502 and 504 connected in series between the second DC signal provided by the DC-DC mechanism 104 and ground 506. The feedback signal 508 to the switching control mechanism 106 is output from a comparator 503, which is connected on its negative input between the resistors 502 and 504, and on its positive input to a reference voltage 501. A signal 510 from the modal mechanism 430 is also input between the resistors 502 and 504. Thus, the comparator 503 compares the voltage at the point between the resistors 502 and 504 to the reference voltage 501, and outputs the signal 508 based thereon.

The modal mechanism 430 includes a resistor 512 and a capacitor 513 connected in series between the second DC signal provided by the DC-DC mechanism 104 and a transistor 514. In another embodiment, additional resistors, inductors, and/or capacitors, or a combination thereof, may be connected in place of or in combination with the resistor 512 and the capacitor 513. The transistor 514 is itself connected to the signal 510 and the control signal received from the electronic device, as indicated by the incoming arrow 116. When the control signal is not asserted by the electronic device, the transistor 514 is off. However, when the control signal is asserted by the electronic device, the transistor 514 is on. The resistor 502 of the comparing mechanism 432 is thus effectively connected in a dynamic parallel combination with the resistor 512 and the capacitor 513 of the modal mechanism 430 when the transistor 514 is on in the low-power mode. The modal mechanism 430 effectively skews the comparison performed by the comparing mechanism 432, or, put another way, effectively modifies the DC signal as compared by the comparing mechanism 432. The capacitor 513 is the reactive element of the modal mechanism 430, and effectuates the skewing of the second DC signal.

Figure 6A:
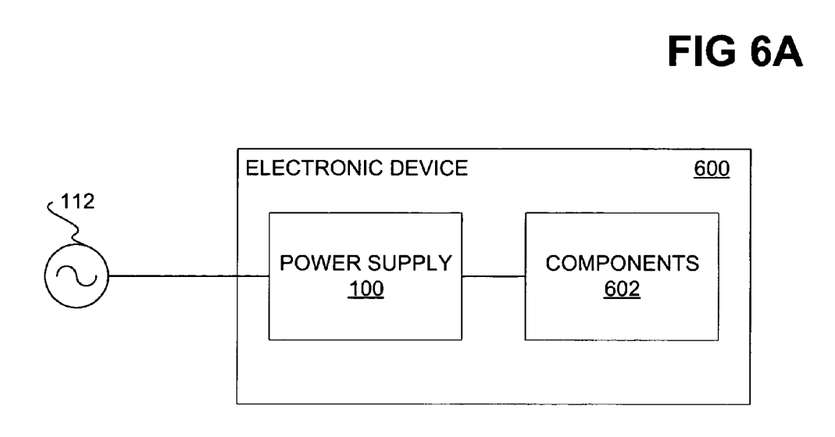
FIGS. 6A and 6B are diagrams of embodiments of an electronic device, according to varying embodiments of the invention.
Figure 6B:
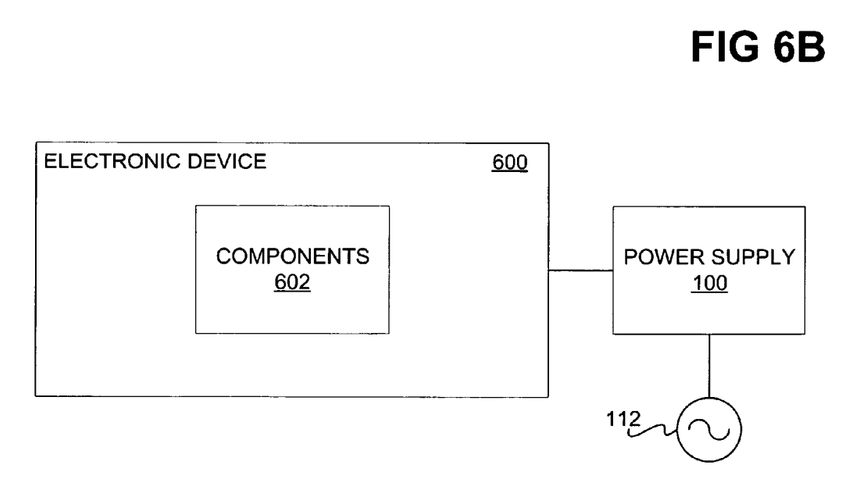

FIGS. 6A and 6B show an electronic device 600, according to varying embodiments of the invention. In FIG. 6A, the power supply 100 that has been described is internal to the electronic device 600, and in FIG. 6B, the power supply 100 is external to the electronic device 600. In both FIGS. 6A and 6B, the power supply 100 is connected to a power source 112, and converts the first AC signal to the second DC signal for use by components 602 of the device 600 in performing the intending functionality of the electronic device 600.

The components 602 are thus those components that enable the electronic device 600 to perform an intended functionality. For example, the components 602 may include an image-forming mechanism, such as an inkjet-printing mechanism or a laser-printing mechanism, such that the electronic device 600 is an image-forming device like an inkjet-printing device or a laser-printing device. The intended functionality in this example is image formation on media. The components 602, and as a result the electronic device 600, when actively operating and performing the intended functionality, cause the power supply 100 to operate in a full-power or a normal-power mode, as has been described. When idling, the components 602, and as a result the electronic device 600, cause the power supply 100 to operate in a low-power mode, as has also been described.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

We claim:

1. A power supply comprising:
    a conversion mechanism to control conversion of a first direct current (DC) signal to a second DC signal by switching the first DC signal to vary a voltage of the second DC signal between first and second voltage levels; and,
    a feedback mechanism to cause the conversion mechanism to switch operation between a nominal-power mode and a reduced-power mode according to a control signal,
    the feedback mechanism comprising a skewing mechanism to skew comparison of the voltage of the second DC signal between third and fourth voltage levels different than the first and second voltage levels in response to receiving the control signal.

2. The power supply of claim 1, wherein in the nominal-power mode the conversion mechanism is caused to switch the first DC signal at least one of a greater duty cycle and at a greater frequency as compared to the duty cycle and the frequency at which the first DC signal is switched within the reduced-power mode.

3. The power supply of claim 2, wherein the feedback mechanism further comprises:
    a comparing mechanism to compare the voltage of the second DC signal to the third voltage level and the fourth voltage level and to generate a feedback signal in response thereto to cause the conversion mechanism to switch the first DC signal low upon the voltage of the second DC signal reaching the third voltage level so that the voltage of the second DC signal decreases and to switch the first DC signal high upon the voltage of the second DC signal reaching the fourth voltage level so that the voltage of the second DC signal increases,
    wherein the modal mechanism is to skew comparison of the voltage of the second DC signal to the third voltage level and the fourth voltage level in response to receiving the control signal, such that the comparing mechanism is effectively caused to compare the voltage of the second DC signal provided to the electronic device to the first voltage level and the second voltage level to switch the first DC signal low upon the voltage of the second DC signal reaching the first voltage level so that the voltage of the second DC signal decreases and to switch the first DC signal at the duty cycle upon the voltage of the DC signal decreasing to the second voltage level so that the voltage of the second DC signal increases.

4. The power supply of claim 3, wherein the modal mechanism is to pass through the second DC signal to the comparing mechanism without modification to allow the conversion mechanism to operate in the nominal-power mode, and is to modify the second DC signal before passing the second DC signal to the comparing mechanism to cause the conversion mechanism to operate in the reduced-power mode.

5. The power supply of claim 4, wherein the modal mechanism is to pass through to the comparing mechanism the second DC signal without modification in absence of assertion of the control signal, and is to modify the second DC signal before passing the second DC signal to the conversion mechanism upon assertion of the control signal.

6. The power supply of claim 2, wherein in the nominal-power mode the second DC signal is regulated.

7. The power supply of claim 1, wherein in the nominal-power mode an electronic device receiving the second DC signal is actively functioning, and in the reduced-power mode the electronic device is idling.

8. The power supply of claim 1, further comprising:
an AC-DC mechanism to receive an alternating current (AC) signal from a power source and to convert the AC signal to the first DC signal; and,
a DC-DC mechanism to convert the first DC signal to the second DC signal by switching the first DC signal high and low and which is controlled by the conversion mechanism, and to provide the second DC signal to an electronic device.

9. The power supply of claim 1, wherein the power supply is external to an electronic device receiving the second DC signal.

10. The power supply of claim 1, wherein the power supply is internal to an electronic device receiving the second DC signal.

11. The power supply of claim 1, wherein an electronic device receiving the second DC signal is an image-forming device.

12. A power supply comprising:
a switching control mechanism to control conversion of a first direct current (DC) signal to a second DC signal provided to an electronic device by switching the first DC signal to vary the second DC signal;
a comparing mechanism to compare a voltage of the second DC signal provided to the electronic device to a first voltage level and a second voltage level and to cause the switching control mechanism to switch the first DC signal low upon the voltage of the second DC signal reaching the first voltage level so that the voltage of the second DC signal decreases and to switch the first DC signal high upon the voltage of the second DC signal reaching the second voltage level so that the voltage of the second DC signal increases; and,
a modal mechanism to pass through the second DC signal to the comparing mechanism without modification in absence of assertion of a control signal by the electronic device to cause the switching control mechanism to operate in a normal-power mode, and to modify the second DC signal before passing the second DC signal to the comparing mechanism upon assertion of the control signal by the electronic device to cause the switching control mechanism to operate in a low-power mode.

13. The power supply of claim 12, wherein the normal-power mode is in which the switching control mechanism is caused to switch the first DC signal at a duty cycle such that the voltage of the second DC signal fluctuates between the first voltage level and the second voltage level.

14. The power supply of claim 13, wherein the low-power mode is in which the switching control mechanism is caused to switch the first DC signal at the duty cycle until the voltage of the second DC signal reaches a third voltage level different than the first voltage level and then is caused to lessen switching the first DC signal until the voltage of the second DC signal decays to fourth voltage level different than the second voltage level.

15. The power supply of claim 12, wherein in the normal-power mode the electronic device is actively functioning, and in the low-power mode the electronic device is idling.

16. The power supply of claim 12, further comprising:
an AC-DC mechanism to receive an alternating current (AC) signal from a power source and to convert the AC signal to the first DC signal; and,
a DC-DC mechanism to convert the first DC signal to the second DC signal by switching the first DC signal high and low and which is controlled by the switching control mechanism, and to provide the second DC signal to the electronic device.

17. The power supply of claim 12, wherein the electronic device is an image-forming device.

18. A power supply comprising:
a switching control mechanism to control conversion of a first direct current (DC) signal to a second DC signal provided to an electronic device by switching the first DC signal to vary the second DC signal; and,
means for causing the switching control mechanism to switch operation between a full-power mode and a low-power mode according to a control signal received from the electronic device,
the low-power mode in which the switching control mechanism is caused to switch the first DC signal at a duty cycle until a voltage of the second DC signal reaches a first voltage level and then is caused to lessen switching of the first DC signal until the voltage of the second DC signal decays to a second voltage level,
the means skewing comparison of the voltage of the second DC signal between third and fourth voltage levels different than the first and second voltage levels in response to receiving the control signal.

19. The power supply of claim 18, wherein the full-power mode is in which the switching control mechanism is caused to switch the first DC signal at the duty cycle such that the voltage of the second DC signal fluctuates between a third voltage level and a fourth voltage level.

20. The power supply of claim 18, wherein the electronic device is an image-forming device.

21. An electronic device comprising:
one or more components to perform a predetermined functionality of the electronic device; and,
a power supply to convert a first direct current (DC) signal to a second DC signal to power the one or more components, the power supply having a low-power mode in which the first DC signal is switched at a duty cycle until a voltage of the second DC signal reaches a first voltage level and then lessens switching of the first DC signal until the voltage of the second DC signal decays to a second voltage level,
wherein the power supply is to skew comparison of the voltage of the second DC signal between third and fourth voltage levels different than the first and second voltage levels in response to receiving the control signal.

22. The electronic device of claim 21, wherein the predetermined functionality is image formation on media, such that the electronic device is an image-forming device.

23. The electronic device of claim 21, wherein the power supply further has a full-power mode in which the first DC signal is switched at the duty cycle such that the voltage of the second DC signal fluctuates between a third voltage level and a fourth voltage level.

24. The electronic device of claim 23, wherein the one or more components assert a control signal to cause the power supply to operate in the low-power mode, and de-assert the control signal to cause the power supply to operate in the full-power mode.

25. The electronic device of claim 23, wherein in the full-power mode the one or more components are actively performing the predetermined functionality, and in the low-power mode the one or more components are idling.

26. A method comprising:
converting a first direct current (DC) signal to a second DC signal,
providing the second DC signal to an electronic device;
in response to receiving a first control signal from the electronic device to operate in a low-power mode:
switching the first DC signal at a duty cycle until a voltage of the second DC signal reaches a first voltage level;
lessening switching of the first DC signal until the voltage of the second DC signal decays to a second voltage; and,
skewing comparison of the voltage of the second DC signal between third and fourth voltage levels different than the first and second voltage levels.

27. The method of claim 26, further comprising initially receiving the first control signal from the electronic device to operate in the low-power mode.

28. The method of claim 26, further comprising idling by the electronic device in the low-power mode.

29. The method of claim 26, further comprising, in response to receiving a second control signal from the electronic device to operate in a normal-power mode, switching the first DC signal at the duty cycle so that the voltage of the second DC signal fluctuates between a third voltage level and a fourth voltage level, until the first control signal is again received from the electronic device to operate again in the low-power mode.

30. The method of claim 29, further comprising actively functioning by the electronic device in the normal-power mode.

* * * * *

UNITED STATES PATENT AND TRADEMARK OFFICE
CERTIFICATE OF CORRECTION

| | | |
|---|---|---|
| PATENT NO. | : 7,019,995 B2 | Page 1 of 1 |
| APPLICATION NO. | : 10/713184 | |
| DATED | : March 28, 2006 | |
| INVENTOR(S) | : Robert Niemand et al. | |

It is certified that error appears in the above-identified patent and that said Letters Patent is hereby corrected as shown below:

Column 11, line 3, in Claim 26, delete "signal," and insert -- signal; --, therefor.

Column 11, line 10, in Claim 26, after "voltage" insert -- level --.

Signed and Sealed this
Twenty-eighth Day of December, 2010

David J. Kappos
*Director of the United States Patent and Trademark Office*